United States Patent
Lee

(10) Patent No.: US 6,785,247 B1
(45) Date of Patent: Aug. 31, 2004

(54) METHOD AND APPARATUS FOR CONTROLLING FORWARD DIRECTION POWER RATIO IN W-CDMA WIRELESS COMMUNICATION BASE STATION

(75) Inventor: Jang-Ho Lee, Kyungki-Do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/532,044

(22) Filed: Mar. 21, 2000

(30) Foreign Application Priority Data

Jun. 21, 1999 (KR) .............................. 99-23341

(51) Int. Cl.[7] .............................................. G08C 17/00
(52) U.S. Cl. ..................... 370/311; 370/252; 370/335; 370/342
(58) Field of Search ................................ 370/311, 329, 370/330, 335, 342, 441, 252, 468

(56) References Cited

U.S. PATENT DOCUMENTS

| | | | | |
|---|---|---|---|---|
| 5,485,486 A | * | 1/1996 | Gilhousen et al. | 370/335 |
| 5,539,728 A | * | 7/1996 | Gaiani et al. | 370/342 |
| 5,596,570 A | * | 1/1997 | Soliman | 370/252 |
| 5,715,526 A | * | 2/1998 | Weaver et al. | 455/126 |
| 5,872,775 A | * | 2/1999 | Saints et al. | 370/342 |
| 6,072,778 A | * | 6/2000 | Labedz et al. | 370/252 |
| 6,084,904 A | * | 7/2000 | Wang et al. | 375/130 |
| 6,304,562 B1 | * | 10/2001 | Kim et al. | 370/332 |
| 6,307,849 B1 | * | 10/2001 | Tiedemann, Jr. | 370/335 |
| 6,374,118 B1 | * | 4/2002 | Toskala et al. | 455/522 |
| 6,377,555 B1 | * | 4/2002 | Lee et al. | 370/252 |
| 6,377,813 B1 | * | 4/2002 | Kansakoski et al. | 455/522 |
| 6,393,276 B1 | * | 5/2002 | Vanghi | 455/422.1 |
| 6,434,130 B1 | * | 8/2002 | Soininen et al. | 370/331 |

* cited by examiner

Primary Examiner—Ricky Ngo
Assistant Examiner—Kevin Mew
(74) Attorney, Agent, or Firm—Fleshner & Kim, LLP

(57) ABSTRACT

A method and apparatus for controlling a forward direction power ratio in a W-CDMA wireless base station including the steps of: recognizing a variation in number of traffic channels; recognizing a data transfer speed; computing a power ratio of each channel according to the number of traffic channels and the data transfer speed; and re-adjusting an existing power ratio according to the computed power ratio of each channel.

30 Claims, 2 Drawing Sheets

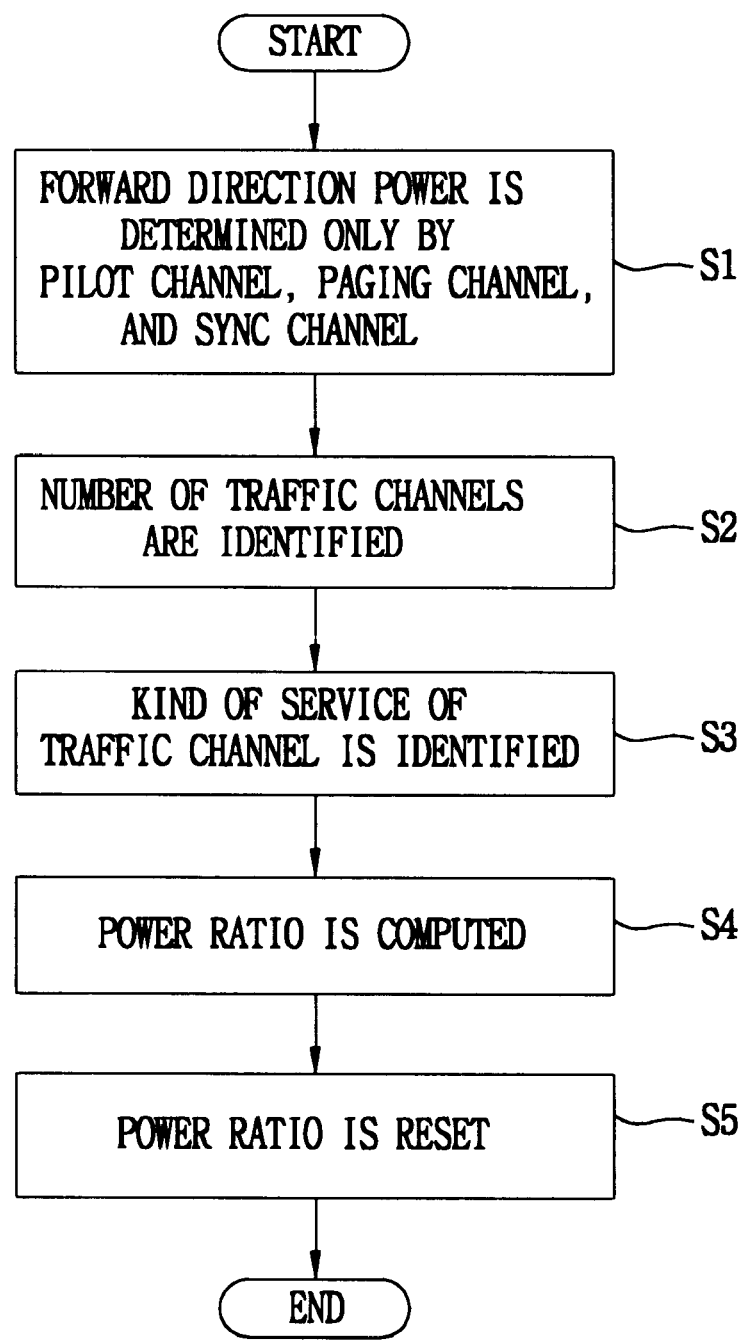

METHOD AND APPARATUS FOR CONTROLLING FORWARD DIRECTION POWER RATIO IN W-CDMA WIRELESS COMMUNICATION BASE STATION

BACKGROUND OF THE INVENTION

1. Field of the Invention

The present invention relates to a wireless communication system, and more particularly, to a W-CDMA (Wide band-Code Division Multiple Access) wireless communication system.

2. Background of the Related Art

Generally, a wireless communication system such as a WLL (Wireless local loop) adopts a CDMA multi-connection method that has a large accommodation capacity for subscribers compared to other connection methods. Unlike the existing narrow band CDMA method, a wide band CDMA method is capable of implementing an ISDN (integrated services data network) service and a packet communication network, as well as transferring a call, a facsimile, and data.

FIG. 1 is a schematic block diagram of the W-CDMA WLL system, which includes an RIU (radio interface unit) 20 for receiving a signal from a subscriber terminal 10 of a user and wirelessly transferring it to a base station via antennas. The base station includes a RP (radio port) 30 for handling connection and release of a signal wirelessly with the RIU 20. An RPC (radio port controller) 40 connects a call link between the RP 30 and a WLL switching system 50, and a WLL switching system 50 establishes a call link with an existing PSTN (public switch telephone network) 60.

In the WLL system constructed as described above, a forward direction power from the RP 30 to the RIU 20 includes a pilot channel, a synchronization channel, a paging channel, a traffic channel and a signal channel. Accordingly, the RP 30 is able to heighten a communication efficiency by adequately controlling a power ratio between the channels with a limited forward direction power.

Generally, there is a standard for constantly maintaining and using the ratio of each channel that constructs the forward direction power or a reverse direction power in the CDMA wireless communication system. For example, a forward direction power defined in an international standard, IS-97-A, presented by Qualcomm Co., is constructed such that 20% is occupied by a pilot channel and the remaining 80% is occupied by the synchronization channel, paging channel and traffic channel (total forward direction power equals 100%).

The power ratio of IS-97-A must be altered in a W-CDMA system to account for the power of the signal channel. In this respect, the power value of the signal channel is defined to be different depending on the data speed of the traffic channel.

The RP 30 of the background W-CDMA WLL system determines a power ratio of each channel on the basis of the entire traffic channel that it can receive, and controls the forward direction power of each channel by applying these power ratios to the fixed power value.

However, the background art has a problem in that, since the previously established power ratio is used for each channel, an actual power ratio is determined differently depending on the number of individual traffic channels currently connected to the RP 30. For example, if the power ratio of each channel is determined based on the assumption that 30 individual traffic channels in total are connected, a relative power ratio of each individual traffic channel actually received by the RIU 20 would be much different when 10 individual traffic channels are actually connected to be operated.

Thus, a problem arises in that the power ratio would unavoidably offend the standard as defined, and thus, the smaller the number of actual individual traffic channels becomes, the smaller the power ratio of the traffic channel to the other channels becomes, which negatively affects its communication quality.

SUMMARY OF THE INVENTION

An object of the invention is to solve at least the above problems and/or disadvantages and to provide at least the advantages described hereinafter.

An object of the present invention is to improve the power ratio.

Another object of the present invention is to improve the power ratio in a forward direction.

A further object of the present invention is maintain a constant power ratio.

Still another object of the present invention is to provide a method for controlling the forward direction power ratio in a W-CDMA wireless base station in which the power ratio of each channel is adjusted according to the number of traffic channels so that a constant power ratio is maintained regardless of the number of the traffic channels.

To achieve these and other advantages and, in accordance with the purpose of the present invention, as embodied and broadly described herein, there is provided a method for controlling a forward direction power ratio of a plurality of channels in a wireless base station including the steps of: recognizing a variation in the number of traffic channels; recognizing a data transfer speed of the traffic channel; determining a power ratio for each channel according to the number of traffic channels and the data transfer speed; and re-adjusting an existing power ratio according to the determined power ratio for each channel.

To further achieve these and other advantages and in accordance with the purpose of the present invention, as embodied and broadly described herein, there is provided a wireless communication system including: a remote system that receives and transmits information data; and a base station that receives and transmits information data, wherein communication between the remote system and the base station is established by a plurality of channels including a first channel, a power ratio for the plurality of channels being based on a number of individual first channels and a data transfer rate of the first channel.

To still further achieve these and other advantages and in accordance with the purpose of the present invention, as is embodied and broadly described herein, there is provided a base station including: a radio frequency device that converts signals to and from a wireless signal; an antenna that transmits and receives the wireless signal; and a controller that digitizes a signal to be transferred to the radio frequency device, spreads it, and converts to an analog signal, and controls a first channel power and a second channel power according to a power ratio determined based on a number of individual it first channels.

Additional advantages, objects, and features of the invention will be set forth in part in the description which follows and in part will become apparent to those having ordinary skill in the art upon examination of the following or may be

BRIEF DESCRIPTION OF THE DRAWINGS

The invention will be described in detail with reference to the following drawings in which like reference numerals refer to like elements wherein:

FIG. 3 is a flow chart of a process of controlling a forward direction power ratio in the RP of the W-CDMA WLL system in accordance with the present invention.

DETAILED DESCRIPTION OF PREFERRED EMBODIMENTS

Figure 1:
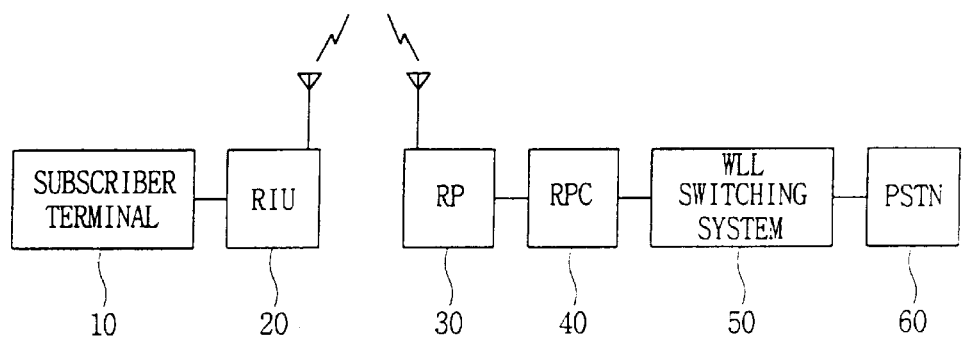
FIG. 1 is a schematic block diagram of a general W-CDMA WLL system in accordance with background art.
Figure 2:
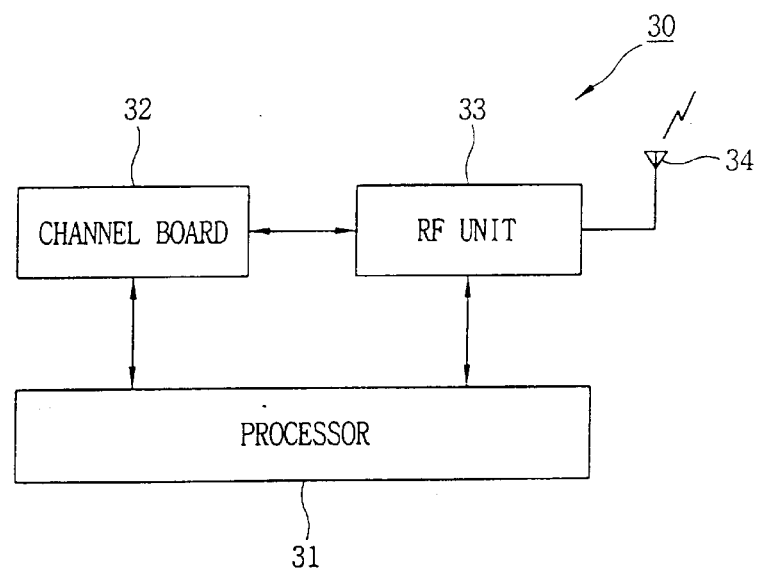
FIG. 2 shows an example of a construction of internal hardware of a wireless base station (that is, a radio port (RP) 30) of a W-CDMA WLL system in accordance with the present invention.

The basic construction of a W-CDMA WLL system in accordance with the present invention is similar to that of the background art shown in FIG. 1. FIG. 2 shows an example of internal hardware of a wireless base station (RP 30) of the W-CDMA WLL system in accordance with a preferred embodiment of the present invention. FIG. 3 is a flow chart of a process of controlling a forward direction power ratio in the RP 30 of the W-CDMA wireless base station.

As shown in FIG. 2, an example of the radio port 30 of the W-CDMA WLL system in accordance with the present invention includes a processor 31 for computing a power ratio of each channel according to the number of traffic channels that are currently connected, accordingly controlling the power of a pilot channel, a synchronization channel and a paging channel. The radio port 30 also outputs a power control signal for the traffic channel and the signal channel. The radio port 30 also includes a channel board 32 for digitalizing a signal to be transferred to the RIU 20, spreading it and converting it to an analog signal, and controlling the power of the traffic channel and the signal channel according to the signal provided from the processor 31. The radio port 30 further includes an RF unit 33 for converting the signals provided from the processor 31 and the channel board 32 to a high frequency wireless signal and transferring it to the RIU 20 through an antenna 34.

Based on the international standard IS-97-A, 20% of the entire power is allotted to a pilot channel, and the remaining 80% is allotted to the synchronization channel, the paging channel, the traffic channel and the signal channel. Further, the power value of each channel on the basis of the traffic channel is expressed in detail by the following Table 1.

[Table 1]

Pilot channel power=20%

Paging channel power+synchronization channel power+traffic channel power+signal channel power=80% paging channel power=2×the number of channels×traffic channel power;

synchronization channel power=(the number of channels×traffic channel power)/2 traffic channel power=the number of channels×individual traffic channel power signal channel power=individual traffic channel power/correction value In this respect, since the power of the signal channel is varied according to the transfer speed of the traffic channel, the correction value is set as a predetermined proportional constant.

For example, in the W-CDMA WLL system of the present invention, when the transfer speed of the traffic channel is 32 Kbps, the correction value is set so that the power of the traffic channel is 7.258 times as much as the power of the signal channel. Namely, for a given data transfer speed of the traffic channel, the power of the traffic channel is increased proportionally to the power of the signal channel. Based on the criteria of Table 1, the processor 31 begins operation in a previously programmed state in which the power ratio of each channel is computed.

In FIG. 3, the processor 31 determines a forward direction power only with the pilot channel, the synchronization channel and the paging channel at the initial state of the operation in step S1. When a traffic channel is generated with the RIU 20 through the channel board 32, the channel board 32 identifies the number of currently connected traffic channels and sends this information to the processor 31 in step S2. Upon receipt of the number of traffic channels, the processor 31 judges the kind of service of the formed traffic channel to thereby obtain a predetermined proportional constant (correction value) of the power of the signal channel according to the data transfer speed in step S3. The forward direction power ratio of each channel is computed according to Table 1 in step S4, and the existing power ratios are re-set in step S5 according to the power ratios computed in step S4.

Accordingly, the processor 31 controls and outputs each of the power values of the pilot channel, synchronization channel and paging channel. The processor 31 also outputs to the channel board 32 a control signal for controlling the power of the traffic channel and the power of the signal channel.

Then, the channel board 32 controls the power of the traffic channel and the power of the signal channel to the RIU 20 according to the control signal inputted from the processor 31 and transfers it to the RIU 20 along with a signal to be transferred thereto. The signal outputted from the processor 31 and the channel board 32 is converted to a high frequency wireless signal through the RF unit 33 and then wirelessly transferred to the RIU 20.

As so far described, the W-CDMA wireless base station of the present invention recognizes the number of currently connected traffic channels, adjusts each power value according to the number of traffic channels, and constantly maintains the power ratio of each channel, so that in any environment it can satisfy the standard of the forward direction power ratio as defined by the international standards, and accordingly, the communication quality can be improved.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for controlling forward direction power in a W-CDMA wireless communication system, comprising:

recognizing a number of currently connected individual traffic channels;

recognizing a transfer speed; and adjusting a power value of one or more of a plurality of channels to constantly maintain a power ratio among the channels.

2. A method for controlling a forward direction power ratio of a plurality of channels in a W-CDMA wireless base station, comprising:

recognizing a variation in a number of individual traffic channels of a traffic channel;

recognizing a data transfer speed of the traffic channel;

determining power values for the plurality of channels according to the number of individual traffic channels and the data transfer speed; and re-adjusting existing power of the plurality of channels to match the determined power values, wherein the re-adjusting step includes maintaining a desired power ratio among the plurality of channels irrespective of the variation in the number of individual traffic channels.

3. The method according to claim 2, wherein a pilot channel power is 20% of a total forward direction power.

4. The method according to claim 3, wherein the sum of a synchronization channel power, a paging channel power, a traffic channel power and a signal channel power is 80% of a total forward direction power.

5. The method according to claim 2, wherein a traffic channel power is determined by multiplying a power of an individual traffic channel by the number of individual traffic channels.

6. The method according to claim 4, wherein the paging channel power is determined by doubling a value obtained by multiplying the traffic channel power by the number of individuals traffic channels.

7. The method according to claim 4, wherein the synchronization channel power is determined by multiplying the traffic channel power by the number of individual traffic channels and dividing by 2.

8. The method according to claim 4, wherein the signal channel power is variably set in proportion to the data transfer speed of the traffic channel.

9. The method according to claim 8, wherein when the data transfer speed is 32 Kbps, the traffic channel power is approximately 7.26 times the signal channel power.

10. The method according to claim 8, wherein when the data transfer speed is 64 Kbps, the traffic channel power is approximately 14.52 times the signal channel power.

11. The method according to claim 3, wherein the traffic channel power is determined by multiplying the power of an individual traffic channel by the number of individual traffic channels, a paging channel power is determined by doubling the value obtained by multiplying the traffic channel power by the number of individuals traffic channels, a synchronization channel power is determined by multiplying the traffic channel power by the number of individual traffic channels and dividing by 2, and a signal channel power is variably set in proportion to the data transfer speed of the traffic channel.

12. The method according to claim 11, wherein a pilot channel power is 20% of a total forward direction power, and the sum of the synchronization channel power, the paging channel power, the traffic channel power and the signal channel power is 80% of the total forward direction power.

13. A W-CDMA wireless communication base station that controls the forward direction power ratio according to the method of claim 12.

14. A W-CDMA wireless communication base station that controls the forward direction power ratio according to the method of claim 2.

15. A method for controlling power in a W-CDMA communications system, comprising:

connecting a mobile terminal and a base station; and maintaining a constant power ratio for a predetermined number of channels between the mobile terminal and base station as a number of traffic channels connected to the base station changes.

16. The method of claim 15, wherein said constant power ratio is defined by a predetermined communications standard.

17. The method of claim 16, wherein the communications standard is IS-97-A.

18. The method of claim 15, wherein said constant power ratio includes 20% power allotted to the pilot channel and 80% power allotted to remaining ones of said channels.

19. The method of claim 15, wherein a sum of the first and second fixed values equals a total power allotted for communicating signals between the mobile terminal and base station.

20. The method of claim 15, wherein the adjusting step includes:

determining a number of traffic channels currently connected to the base station;

determining a kind of service corresponding to the traffic channel between the mobile terminal and base station; and computing power values for said at least two of the paging channel, synchronization channel, traffic channel, and signal channel based on the number of traffic channels and kind of service determined in the determining steps, said power values being computed so that a sum of the power values maintains the second fixed value.

21. The method of claim 20, wherein the kind of service is determined based on data transfer speed information.

22. The method of claim 20, wherein the computing step includes:

determining a correction value for a power of the signal channel based on the kind of data service and computing the power value for the signal channel and the traffic channel based on the correction value.

23. A system for controlling power in a W-CDMA communications system, comprising:

a detector which detects a number of traffic channels connected to a base station; and a processor which maintains a constant power ratio for a predetermined number of channels between a mobile terminal and the base station as a number of traffic channels connected to the base station changes.

24. The system of claim 23, wherein said constant power ratio is defined by a predetermined communications standard.

25. The system of claim 24, wherein the communications standard is IS-97-A.

26. The system of claim 23, wherein said constant power ratio includes 20% power allotted to the pilot channel and 80% power allotted to remaining ones of said channels.

27. The system of claim 23, wherein a sum of the first and second fixed values equals a total power allotted for communicating signals between the mobile terminal and base station.

28. The system of claim 23, wherein the processor determines a kind of service corresponding to the traffic channel between the mobile terminal and base station and computes power values for said at least two of the paging channel, synchronization channel, traffic channel, and signal channel based on the number of traffic channels and the kind of service, said power values being computed so that a sum of the power values maintains the second fixed value.

29. The system of claim 28, wherein the kind of service is determined based on data transfer speed information.

30. The system of claim 28, wherein the processor determines a correction value for a power of the signal channel based on the kind of data service and computes the power value for the signal channel and the traffic channel based on the correction value.

* * * * *